United States Patent [19]
Chan

[11] Patent Number: 5,809,268
[45] Date of Patent: Sep. 15, 1998

[54] METHOD AND SYSTEM FOR TRACKING RESOURCE ALLOCATION WITHIN A PROCESSOR

[75] Inventor: Kin Chan, Austin, Tex.

[73] Assignee: International Business Machines Corporation, Armonk, N.Y.

[21] Appl. No.: 496,833

[22] Filed: Jun. 29, 1995

[51] Int. Cl.$^6$ ........................................ G06F 9/00
[52] U.S. Cl. ................ 395/376; 364/261.3; 364/269.4; 364/263; 364/DIG. 1
[58] Field of Search .................................. 395/390, 391, 395/392, 393, 395, 596

[56] References Cited

U.S. PATENT DOCUMENTS

| | | | |
|---|---|---|---|
| 3,699,479 | 10/1972 | Thompson et al. | 332/16 R |
| 4,056,711 | 11/1977 | Lamar . | |
| 4,145,752 | 3/1979 | Olander, Jr. et al. . | |
| 4,241,416 | 12/1980 | Tarczy-Hornoch . | |
| 4,270,184 | 5/1981 | Shimokawa . | |
| 4,371,931 | 2/1983 | Catiller et al. . | |
| 4,538,255 | 8/1985 | Kern . | |
| 4,575,816 | 3/1986 | Hendrickson et al. . | |
| 4,722,049 | 1/1988 | Lahti . | |
| 5,289,585 | 2/1994 | Kock et al. . | |
| 5,307,464 | 4/1994 | Akao et al. . | |
| 5,581,719 | 12/1996 | Steely, Jr. et al. | 395/383 |
| 5,584,038 | 12/1996 | Papworth et al. | 395/800 |
| 5,586,278 | 12/1996 | Papworth et al. | 395/582 |
| 5,590,352 | 12/1996 | Zuraski, Jr. et al. | 395/800 |

FOREIGN PATENT DOCUMENTS

| | | |
|---|---|---|
| 0312239A2 | 4/1989 | European Pat. Off. . |
| 0677808A2 | 10/1995 | European Pat. Off. . |

OTHER PUBLICATIONS

IBM Technical Disclosure Bulletin, vol. 16, No. 4, Sep. 1973, pp. 1117–1118.

IBM Technical Disclosure Bulletin, vol. 24, No. 9, Feb. 1982, pp. 4454–4459.

James K. Pickett et al., "Enhanced Superscalar Hardware: The Schedule Table", IEEE Computer Society Technical Committees on Supercomputing Applications and Computer Architecture, pp. 636–644, Nov. 1993, Oregon.

Mayan Moudgill et al., Register Renaming and Dynamic Speculation:an Alternative Approach, IEEE Technical Committee on Microprogramming and Microarchitecture, pp. 202–213, Dec. 1993, Texas.

James Smith et al., "Implementing Precise Interrupts in Pipelined Processor", IEEE Transactions on Computers, pp. 562–573, vol. 37, No. 5, May 1988, New York.

*Primary Examiner*—Kevin J. Teska
*Assistant Examiner*—Ayni Mohamed
*Attorney, Agent, or Firm*—Anthony V.S. England; Brian F. Russell; Andrew J. Dillon

[57] ABSTRACT

A method and system are disclosed for tracking the allocation of resources within a processor having multiple execution units which support speculative execution of instructions. The processor includes a resource counter including a first counter and a second counter and a number of resources, wherein one or more of the resources are allocated to each of a number of instructions dispatched for execution to the execution units. In response to dispatching an instruction among the plurality of instructions to one of the execution units for execution, the first counter is incremented once for each of the resources allocated to the instruction, and if the instruction is a first instruction within a speculative execution path, the second counter is loaded with a value of the first counter prior to incrementing the first counter. In response to completion of a particular instruction among the number of instructions dispatched to one of the multiple execution units, the first and the second counters are decremented once for each resource allocated to the particular instruction. In response to a refutation of the speculative execution path, a value of the second counter is transferred to the first counter, such that the resource counter tracks a number of the plurality of resources allocated to the plurality of instructions.

22 Claims, 9 Drawing Sheets

METHOD AND SYSTEM FOR TRACKING RESOURCE ALLOCATION WITHIN A PROCESSOR

BACKGROUND OF THE INVENTION

1. Technical Field

The present invention relates in general to an improved method and system for data processing, and in particular to an improved method and system for tracking the allocation of resources within processor that supports speculative execution of instructions. Still more particularly, the present invention relates to a method and system for tracking the allocation of resources within a speculatively executing processor which enable the processor to recover the state of resource allocation following a mispredicted branch.

2. Description of the Related Art

Designers of state-of-the-art processors are continually attempting to improve performance of such processors. Recently, processor designers have developed a number of architectural enhancements that have significantly improved processor performance over processors utilizing conventional architectures. For example, Reduced Instruction Set Computer (RISC) processors utilize reduced instruction sets that enable such processors to achieve low cycle-per-instruction (CPI) ratios. To further increase throughput, processors can also employ a superscaler architecture that enables multiple instructions to be issued and executed simultaneously by a number of execution units. As a further enhancement, execution units within a superscaler processor can be designed to execute in a pipelined fashion in which each execution unit processes multiple instructions simultaneously with one or more instructions at each stage of execution. Finally, state-of-the-art processors are equipped to execute instructions in an order determined by the availability of execution units rather than by sequential programmed order. This so-called "out of order" execution enables a processor to maximize the utilization of available execution unit resources during each cycle.

In a typical pipelined superscaler processor that supports out-of-order processing, one or more instructions are dispatched each cycle to a number of execution units. The instructions are executed opportunistically as execution unit resources become available with the caveat that the execution units must adhere to data dependencies between instructions. That is, if the execution of a first instruction depends upon data resulting from the execution of a second instruction, the first instruction must be executed prior to the second instruction. After an execution unit has completed processing an instruction, the instruction is forwarded to one of the number of completion buffers within the supersealer processor. A completion (rename) buffer is a temporary buffer which holds an instruction until the instruction is completed by transferring the data associated with the instruction from temporary registers to architected registers within the processor.

Although instructions can execute in any order as long as data dependencies are observed, most processors require that instructions are completed (i.e., data committed to architected registers) in program order. One reason for the requirement of in-order completion is to enable the processor to support precise interrupt and exception handling. For example, when an exception such as divide-by-zero arithmetic error occurs, an exception handler software routine will be invoked to manage the interrupt or exception. However, before the exception handler can be invoked, instructions preceding the instruction which generated the exception have to be completed in program order for the exception handler to execute in an environment that emulates the environment which would exist had the instructions been executed in program order. A second reason for the requirement of in-order completion is to enable proper recovery of a prior context if a branch is guessed wrong. As will be appreciated by those skilled in the art, superscaler processors typically include a branch execution unit, which predicts the result of branch instructions. Since the result of a branch instruction is guessed and instructions following the branch instruction reentry point are executed speculatively, the processor must have a mechanism for recovering a prior processor context if the branch is later determined to have been guessed wrong. Consequently, speculatively executed instructions cannot be completed until branch instructions preceding the speculatively executed instructions in program order have been completed.

In order to complete instructions executed out-of-order in program order, the processor must be equipped with facilities which track the program order of instructions during out-of-order execution. In conventional superscaler processors which support out-of-order execution, the program order of instructions is tracked by each of the execution units. However, as the number of execution units and the number of instructions which may be executed out-of-order increase, tracking the program order of instructions burdens the performance of the execution units. Consequently, it would be desirable to provide an improved method and system for managing the instruction flow within a superscaler processor which enables instructions to be dispatched in-order, executed out-of-order, and completed in-order and which does not require that the execution units track the program order of instructions.

A second source of performance problems within processors which support speculative execution of instructions is the recovery of the state of processor resources following a mispredicted branch. Typically, processors which support speculative execution of instructions include a branch history table (BHT) that enables a processor to predict the outcome of branch instructions based upon prior branch outcomes. Thus, utilizing data within the BHT, the processor will begin execution of one or more sequential speculative execution paths which follow branch instruction reentry points. In conventional processors which support speculative execution, once a branch is determined to be guessed wrong, the processor stalls the execution pipeline until all sequential instructions preceding the misguessed branch are completed. Once all valid data is committed from the rename buffers to architected registers, all of the rename buffers are flushed and reset. Thereafter, the processor continues execution and allocation of the rename buffers beginning with the sequential instruction following the alternative execution path. Although this recovery mechanism guarantees that all of the processor resources will be available following a mispredicted branch, the conventional recovery mechanism degrades processor performance since the processor must delay dispatching additional instructions and allocating rename buffer resources until all instructions preceding the misguessed branch are completed.

Consequently, it would be desirable to provide an improved method and apparatus within a processor which enable the processor to restore the correct state of processor resources once a speculative execution path is determined to be mispredicted.

SUMMARY OF THE INVENTION

It is therefore one object of the present invention to provide an improved method and system for data processing.

It is another object of the present invention to provide an improved method and system for tracking the allocation of resources within a processor that supports speculative execution of instructions.

It is yet another object of the present invention to provide an improved method and system for tracking the allocation of resources within a speculatively executing processor which enable the processor to recover the state of resource allocation following a mispredicted branch.

The foregoing objects are achieved as is now described. A method and system are disclosed for tracking the allocation of resources within a processor having multiple execution units which support speculative execution of instructions. The processor includes a resource counter including a first counter and a second counter and a number of resources, wherein one or more of the resources are allocated to each of a number of instructions dispatched for execution to the execution units. In response to dispatching an instruction among the plurality of instructions to one of the execution units for execution, the first counter is incremented once for each of the resources allocated to the instruction, and if the instruction is a first instruction within a speculative execution path, the second counter is loaded with a value of the first counter prior is incrementing the first counter. In response to completion of a particular instruction among the number of instructions dispatched to one of the multiple execution units, the first and the second counters are decremented once for each resource allocated to the particular instruction. In response to a refutation of the speculative execution path, a value of the second counter is transferred to the first counter, such that the resource counter tracks a number of the plurality of resources allocated to the plurality of instructions.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
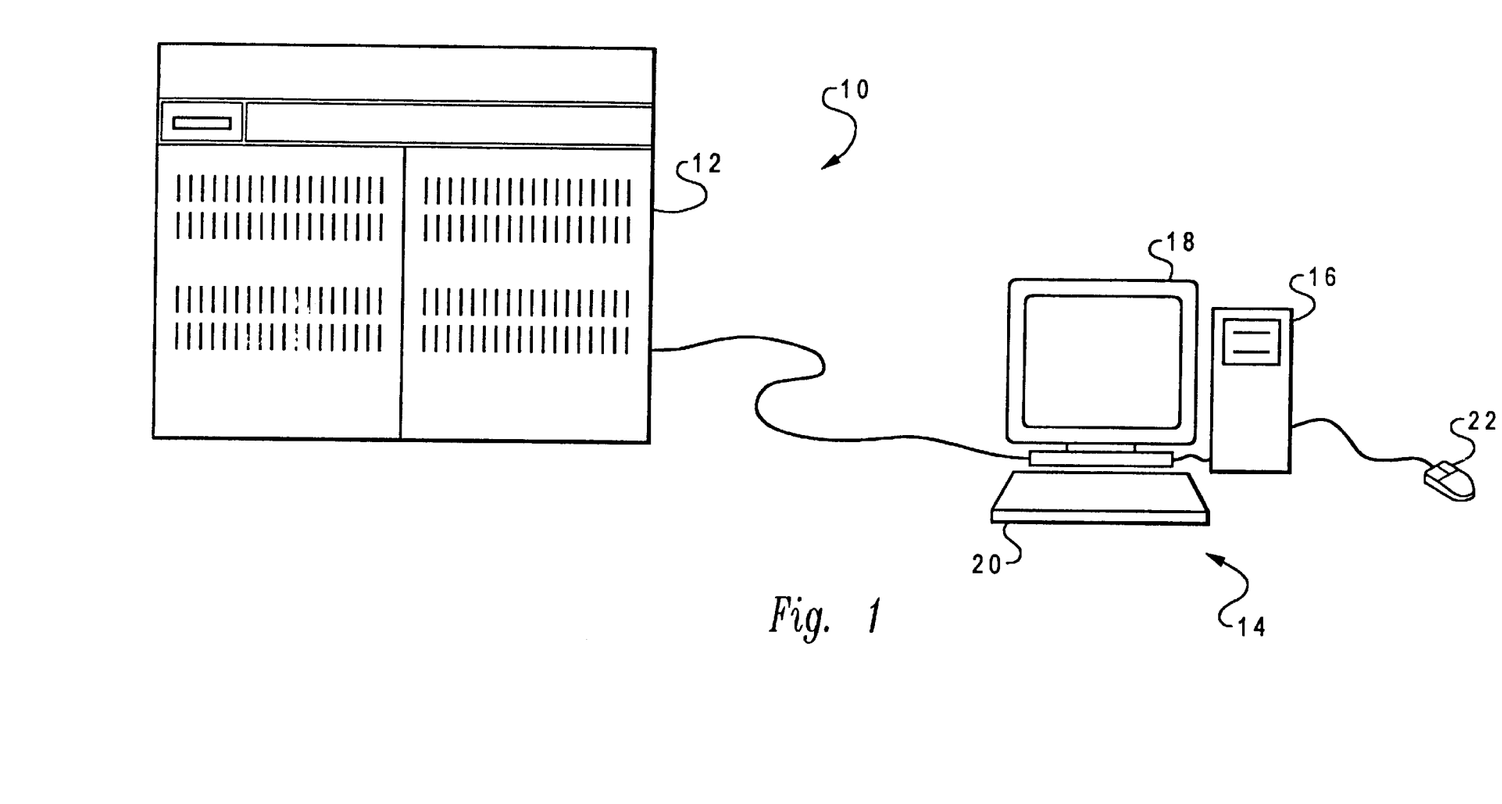
FIG. 1 illustrates a preferred embodiment of a data processing system which utilizes the method and system of the present invention.

With reference now to the figures and in particular with reference to FIG. 1, there is illustrated a block diagram of data processing system which employs the method and system of the present invention. As illustrated, data processing system 10 comprises system unit 12 and one or more local nodes 14, which include personal computer 16, display 18, keyboard 20, and mouse 22. As is well-known to those skilled in the art, a user inputs data to personal computer 16 utilizing keyboard 20, mouse 22, or other suitable input device. The user may then process the data locally utilizing personal computer 16, or transmit the data from personal computer 16 to system unit 12 or another node 14 utilizing well-known networking techniques. It is advantageous for a user to send tasks to system unit 12 for execution since system unit 12 can execute tasks in a relatively short period of time compared to node 14. System unit 12 and personal computer 16 output data to a user via display device 18.

Figure 2:
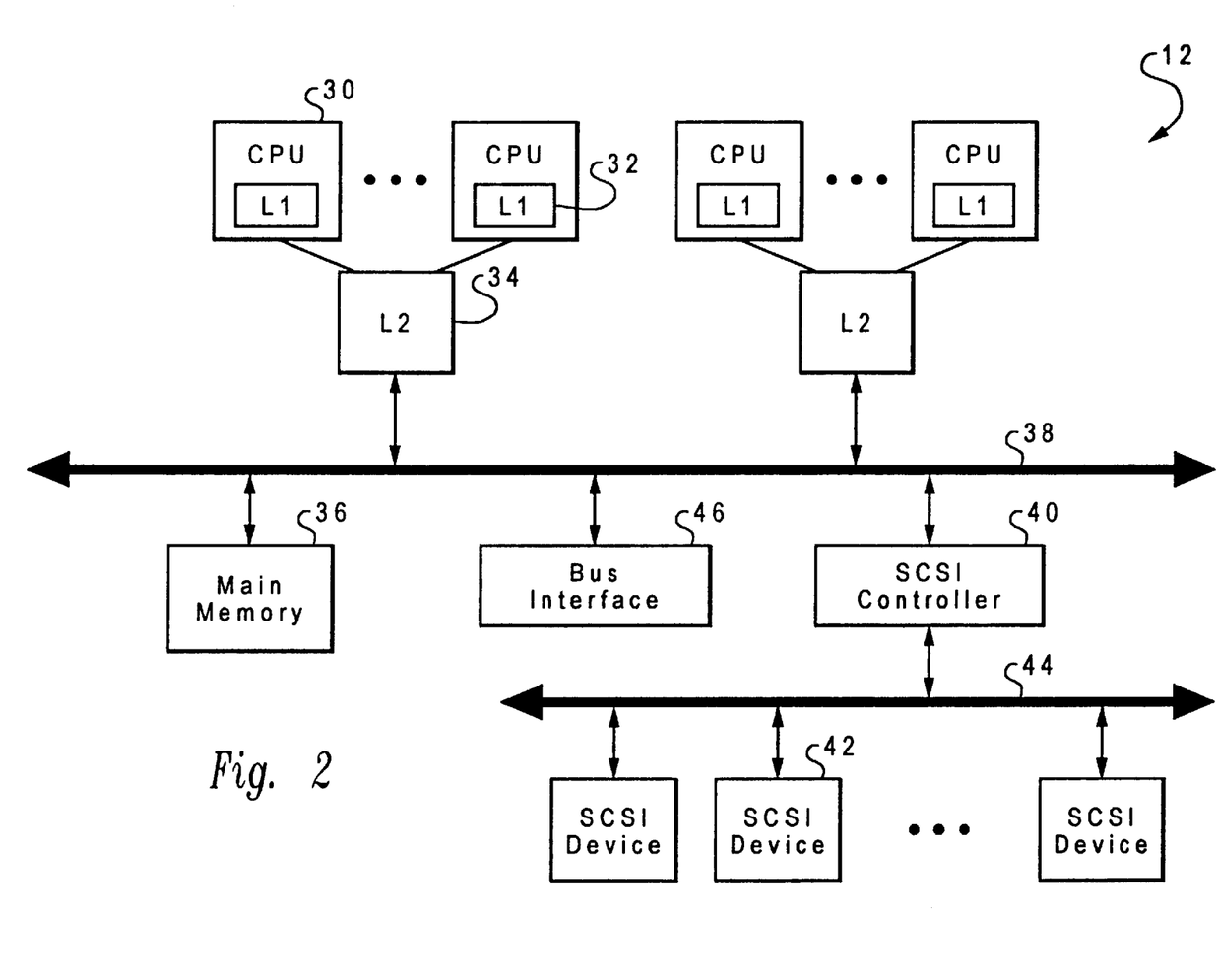
FIG. 2 depicts a block diagram of the system unit of the data processing system illustrated in FIG. 1.

Referring now to FIG. 2, there is depicted a block diagram of system unit 12, which in a preferred embodiment of the present invention comprises a symmetric multiprocessor computer, such as the IBM RISC System/6000. System unit 12 includes one or more CPUs 30, which each include an on-board level one (L1) cache 32. Each CPU 30 is also associated with a level two (L2) cache 34. As will be understood by those skilled in the art, L1 caches 32 and L2 caches 34 each comprise a small amount of high-speed memory which store frequently accessed segments of data and instructions. If data requested by a CPU 30 is not resident within the L1 cache 32 or L2 cache 34 associated with CPU 30, the requested data is retrieved from main memory 36 via system bus 38.

System unit 12 also includes SCSI controller 40 and bus interface 46. SCSI controller 40 enables a user to attach additional SCSI devices 42 to system unit 12 via peripheral bus 44. Bus interface 46 provides facilities that enable multiple local nodes 14 to access system resources available within system unit 12. As will be appreciated by those skilled in the art, system unit 12 includes additional hardware coupled to system bus 46 that is not necessary for an understanding of the present invention and is accordingly omitted for simplicity.

Figure 3:
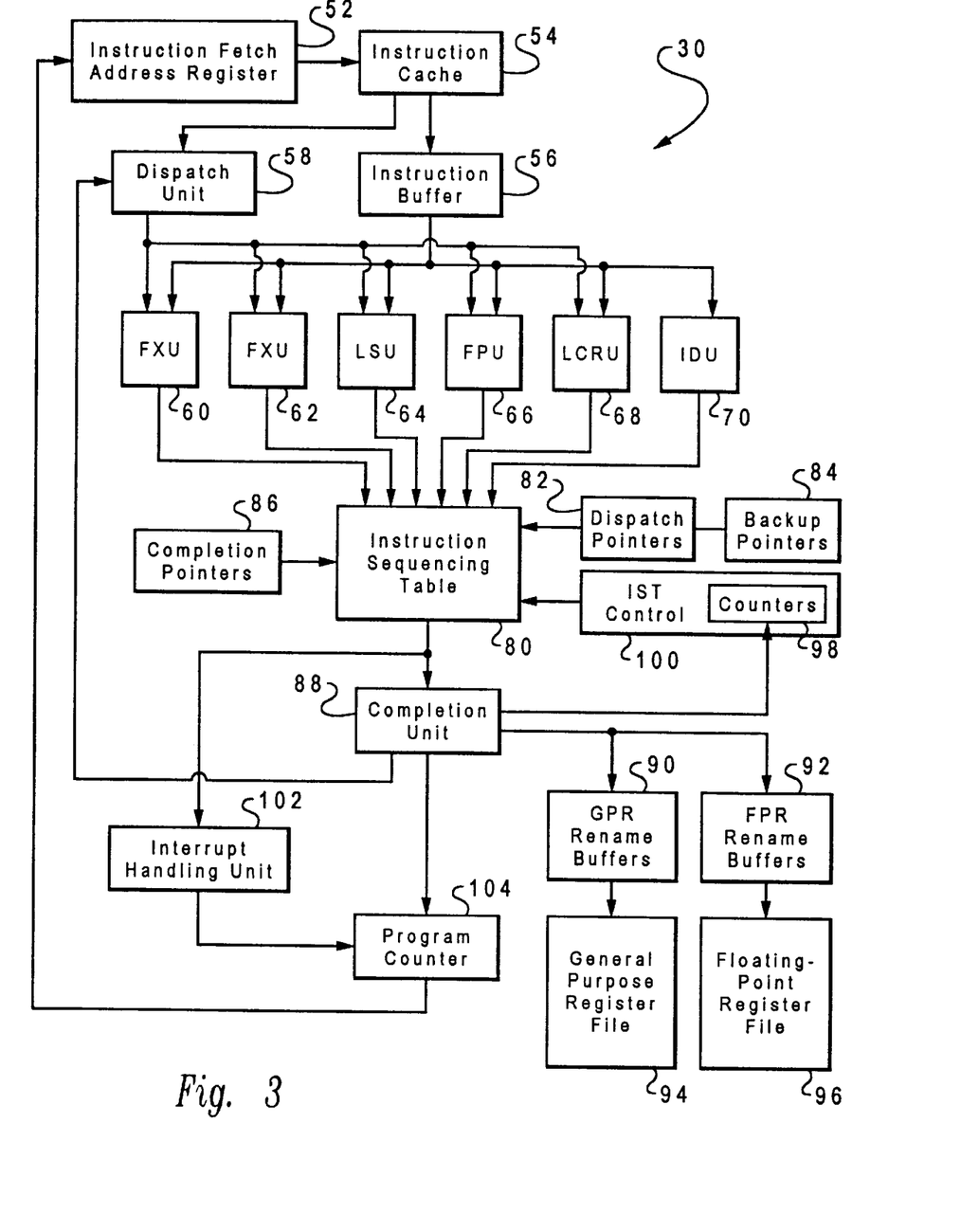
FIG. 3 illustrates a block diagram of a preferred embodiment of a processor which employs the method and system of the present invention.

With reference now to FIG. 3, there is illustrated a preferred embodiment of a CPU 30 in accordance with the method and system of the present invention. In the preferred embodiment depicted in FIG. 3, CPU 30 comprises a superscaler processor that issues multiple instructions into multiple execution pipelines each cycle, thereby enabling multiple instructions to be executed simultaneously. CPU 30 has five execution units 60–68, including fixed-point units 60 and 62, load-store unit 64, floating-point unit 66, and logical condition register unit 68.

Figure 4:
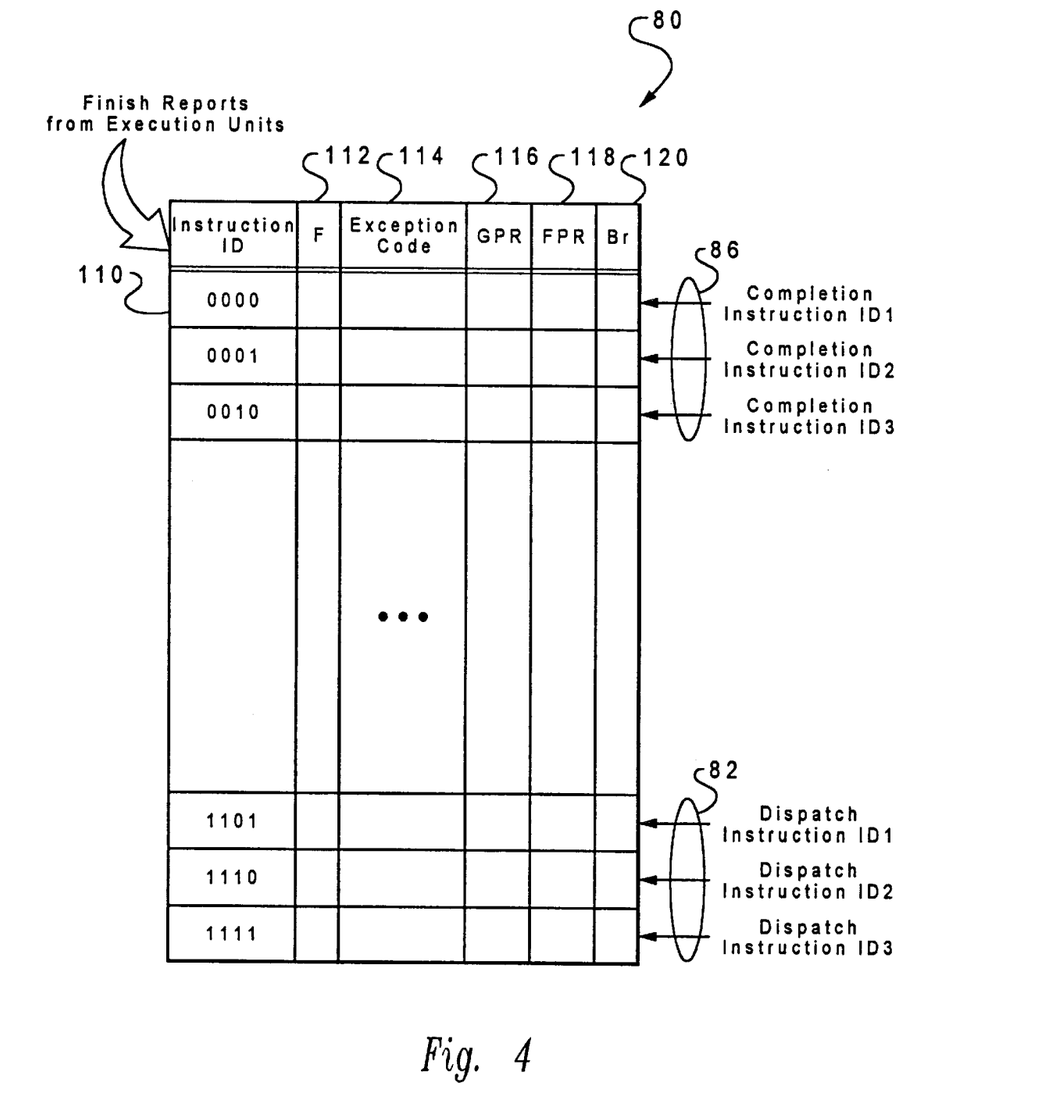
FIG. 4 depicts a more detailed block diagram of the instruction sequencing table (IST) illustrated in FIG. 3.

According to the present invention, CPU 30 also includes instruction sequencing table (IST) 80, which enables CPU 30 to track the execution of instructions by execution units 60–68 and to complete instructions in program order. Referring now to FIG. 4, there is depicted a block diagram of a preferred embodiment of IST 80. As illustrated, IST 80 includes a number of entries 110, which each contain a finish bit 112, exception code field 114, general purpose register (GPR) field 116, floating-point (FPR) register field 118, and branch bit 120. Entries 110 are addressed by one of 16 instruction IDs, which are each associated with an outstanding instruction, that is, an instruction that has been dispatched, but not completed.

Figures 8, 9:
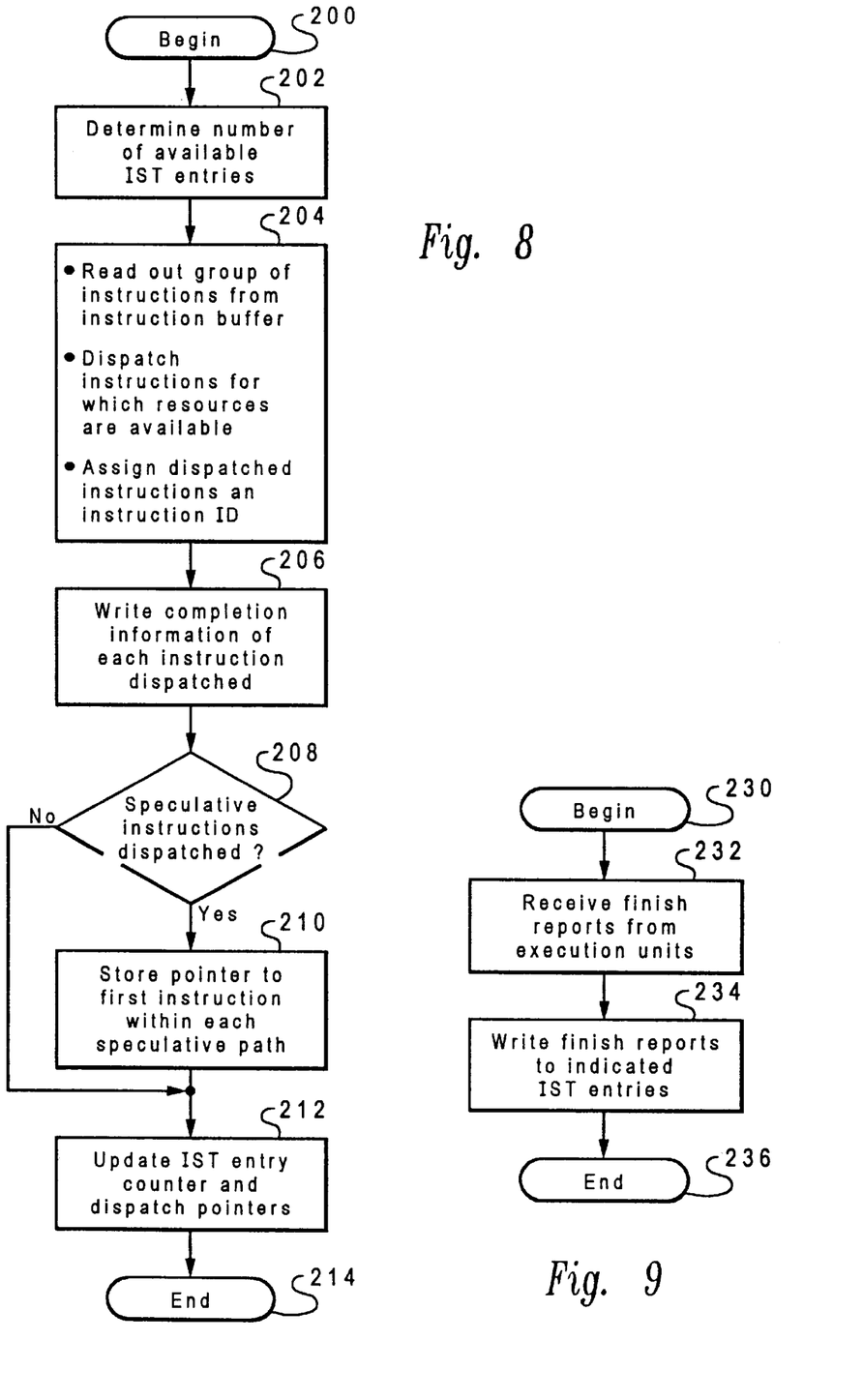
FIG. 8 depicts a flowchart of the operation of the instruction sequencing table during a dispatch cycle.
FIG. 9 illustrates a flowchart of the operation of the instruction sequencing table during a finish cycle.

With reference now to FIG. 8, there is illustrated a flowchart of the operation of IST 80 during a dispatch cycle. As the process begins at block 200, instruction fetch address register (IFAR) 52 calculates the address of the next instructions to be fetched from instruction cache 54 based upon information received from program counter 104. The group of instructions specified by the address generated by IFAR 52 is loaded in parallel into instruction buffer 56 and dispatch unit 58 from instruction cache 54. The process then proceeds to block 202, which depicts determining a number of available entries 110 within IST 80. In a preferred embodiment of the present invention, the number of available entries 110 within IST 80 is easily determined from an IST entry counter 130 (illustrated in FIG. 5) within resource counters 98 that counts the number of allocated IST entries 110. In the preferred embodiment illustrated in FIG. 4, up to three instructions can be dispatched during each cycle if sufficient entries 110 are available within IST 80.

Next, at block 204, instruction buffer 56 reads out in program order a set of instructions for which IST entries 110 are available. Utilizing resource availability information received from completion unit 88 and resource counters 98, dispatch unit 58 enables selected ones of execution units 60–68 to begin execution of instructions for which resources, such as rename buffers 90 and 92, are available. Each instruction dispatched from instruction buffer 56 is assigned one of the instruction IDs specified by dispatch pointers 82. Since instructions are dispatched in program order, entries within IST 80 are allocated in program order. Thus, for the state of IST 80 depicted in FIG. 4, if only a single instruction were dispatched during a dispatch cycle, that instruction would be assigned the entry 110 associated with instruction ID "1101" and specified as dispatch instruction ID 1 by dispatch pointers 82.

The process then proceeds to block 206, which illustrates writing completion information into IST 80 for each instruction dispatched. Each instruction issued from dispatch buffer 56 is processed by instruction decode unit (IDU) 70. IDU 70 decodes each instruction to determine the register resources required to complete the instruction. Thus, by determining the type of each instruction, IDU 70 can determine the number of general purpose registers (GPRs) and floating-point registers (FPRs) required to store the data associated with the instruction. Once IDU 70 has determined the register resources required to execute an instruction, IDU 70 writes the information into the appropriate entry 110 within IST 80. Next, the process proceeds to block 208, which depicts determining which, if any, of the dispatched instructions are speculative. If a dispatched instruction is the first instruction within a speculative execution path, the process proceeds to block 208, which depicts storing the dispatch pointer 82 (i.e., instruction ID) pointing to the entry allocated to the speculative instruction as a backup pointer 84. Storing the instruction ID of the first instruction within each speculative execution path enables CPU 30 to recover the correct execution context if a branch is later determined to have been misguessed.

The process proceeds from either block 208 or block 210 to block 212, which illustrates updating IST entry counter 130 and dispatch pointers 82. IST entry counter 130 is updated by IST control 100 which increments or decrements IST entry counter 130 by the net number of entries 110 allocated during the cycle after taking into account both dispatched and completed instructions. Dispatch pointers 82 are updated by incrementing the instruction ID to which dispatch pointers 82 point by the number of instructions dispatched during the cycle. Utilizing rotating pointers rather than a shifting queue enhances the performance of IST 80 since only dispatch pointers 82 are updated each cycle rather than every entry 110. Thereafter, the process proceeds to block 214 where the process terminates.

Referring now to FIG. 9, there is depicted a flowchart of the operation of IST 80 during a finish cycle. As is well known to those skilled in the art, each of execution units 60–68 is an execution pipeline having multiple stages, such as fetch, decode, execute, and finish, which can accommodate one or more instructions at each stage. Because execution units 60–68 operate independently and because the number of cycles required to execute instructions can vary due to data dependencies, branch resolutions, and other factors, execution units 60–68 execute instructions out of program order. As illustrated, the process begins at block 230 and thereafter proceeds to block 232, which depicts IST 80 receiving an instruction ID and finish report from execution units 60–68 for each instruction finished during the cycle. The finish report includes an exception code which identifies the exception generated by execution of the instruction, if any. The process then proceeds to block 234, which illustrates IST 80 writing the exception code received at block 232 into the exception code field 114 of the entry 110 identified by the finished instruction's ID. In addition, at block 234, finish bit 112 within entry 110 is set to indicate that the instruction has finished execution. In a preferred embodiment of the present invention, up to six finish reports can be written to IST 80 during a finish cycle. Following block 234, the process terminates at block 236.

Figure 10:
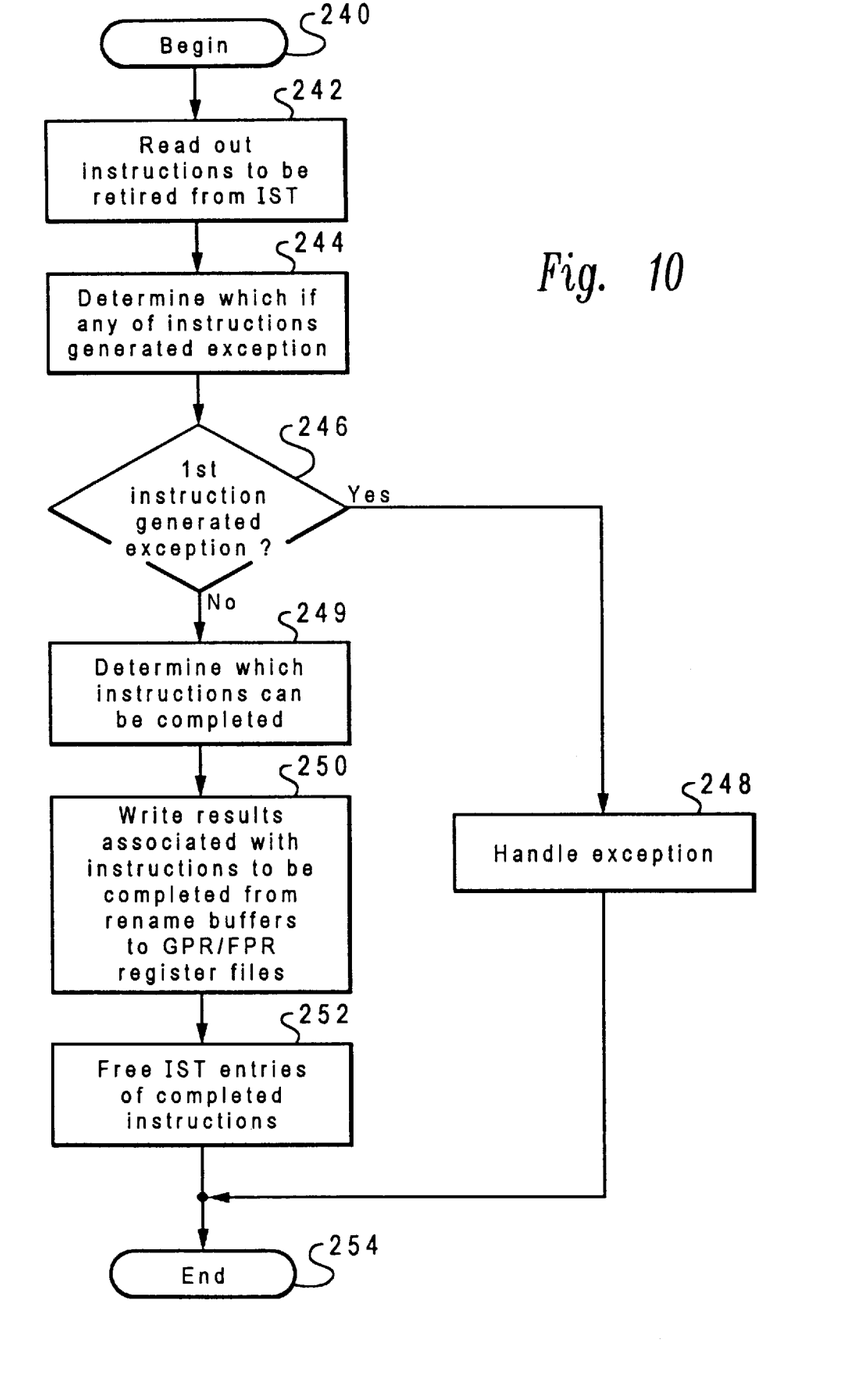
FIG. 10 depicts a flowchart of the operation of the instruction sequencing table during a completion cycle.

With reference now to FIG. 10, there is depicted a flowchart of the operation of IST 80 during a completion cycle. As illustrated, the process begins at block 240 and thereafter proceeds to block 242, which depicts completion unit 88 reading out instructions from IST 80 that are indicated by completion pointers 86. As depicted in FIG. 4, a preferred embodiment of the present invention maintains three completion pointers 86 that specify instructions which can potentially be completed within a given processor cycle. The process then proceeds from block 242 to block 244, which illustrates completion unit 88 determining which of the instructions read out at block 242 generated exceptions that have not been handled. Completion unit 88 determines if an instruction generated an exception by examining the exception code field 114 associated with each instruction. If the first instruction (i.e. the instruction whose associated entry 110 is specified as completion instruction ID 1 by one of completion pointers 86) generated an exception, the process proceeds from block 244 through block 246 to block 248, which depicts forwarding the first instruction to interrupt handling unit 102. As will be understood by those skilled in the art, interrupt handling unit 102 calls an exception handling vector associated with the exception type specified by the exception code written within exception code field 114. Thereafter, the process proceeds from block 248 to block 254.

Returning to block 244, if the first instruction read out from IST 80 did not generate an exception, the process proceeds from block 244 through block 246 to block 249, which depicts determining which of the instructions read out at block 242 can be completed during the current cycle. In order to support precise interrupts, several constraints are placed upon the completion of instructions. First, only instructions that are marked as finished within IST 80 by finish bit 112 can be completed. Second, instructions that generated an exception which has not been handled cannot be completed in the present completion cycle. Third, an instruction can be completed only if all instructions preceding the instruction in program order have already been completed or will be completed during the current completion cycle. Finally, for an instruction to be completed, the requisite number of general purpose registers and floating-point registers must be available within general purpose register file 94 and floating-point register file 96. Following block 249 the process proceeds to block 250, which depicts completion unit 88 completing instructions which satisfy the foregoing conditions by writing data associated with the instructions from GPR and FPR rename buffers 90 and 92 to GPR and FPR files 94 and 96.

Thereafter, the process proceeds from block 250 to block 252, which depicts IST control 100 freeing IST entries 110 that are associated with the instructions completed at block 250. IST control 100 frees IST entries 110 by incrementing each of completion pointers 86 once for each instruction completed. Thereafter, the process proceeds to block 254 where the process terminates.

Figure 5:
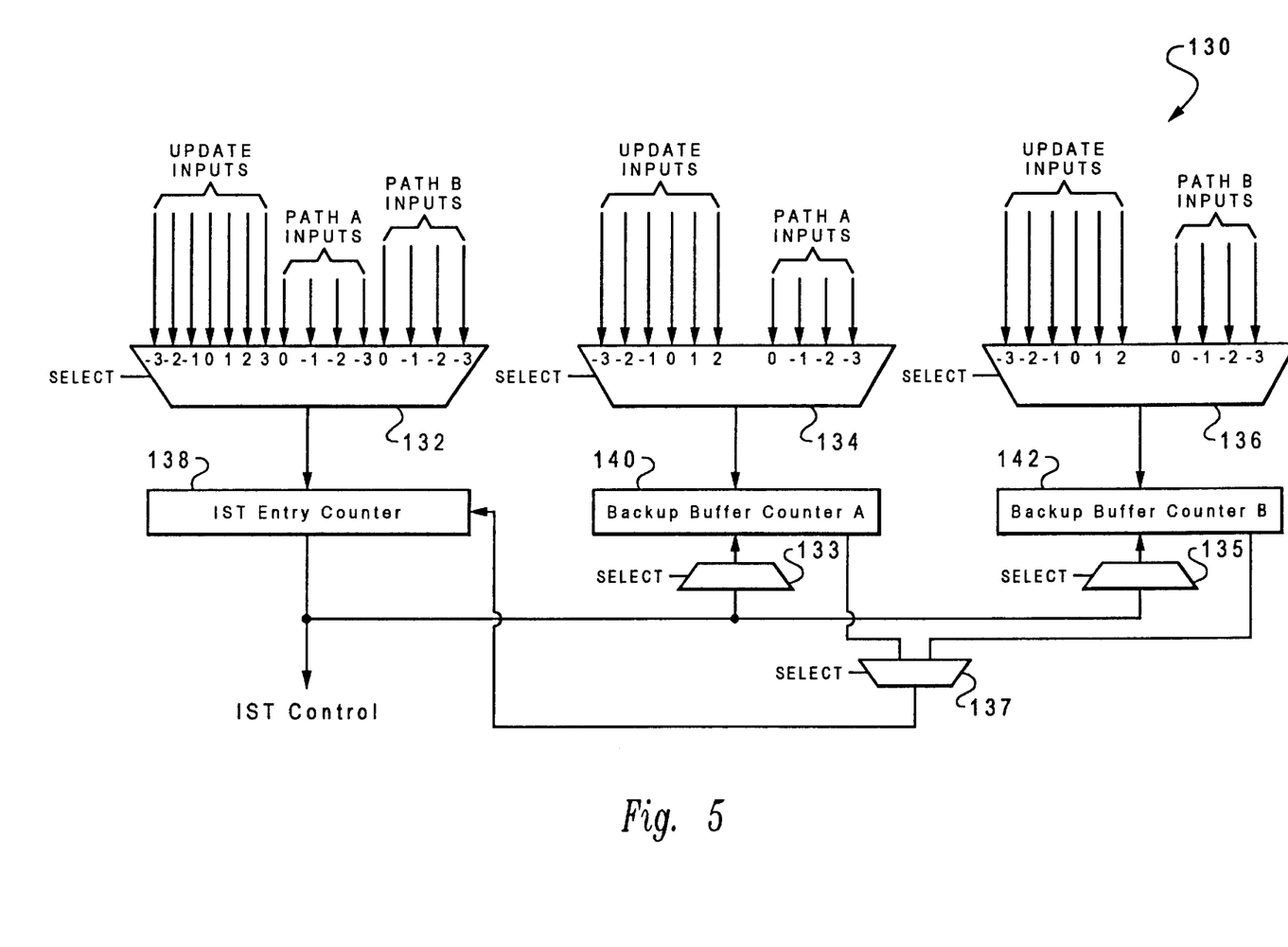
FIG. 5 illustrates a preferred embodiment of a counter which indicates a number of allocated entries within the instruction sequencing table depicted in FIG. 4.
Figure 6:
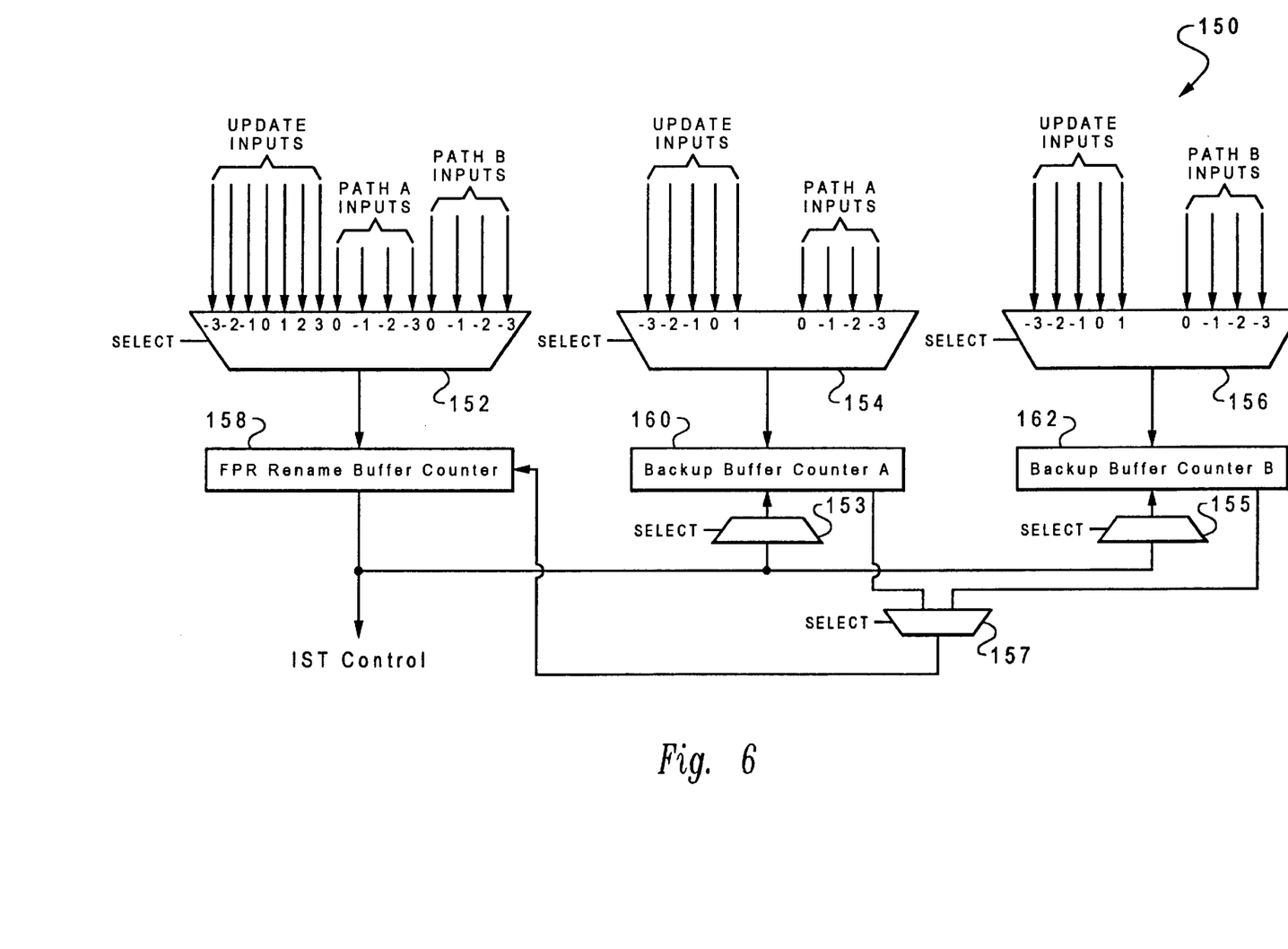
FIG. 6 depicts a preferred embodiment of a counter which indicates a number of allocated floating-point rename buffers.
Figure 7:
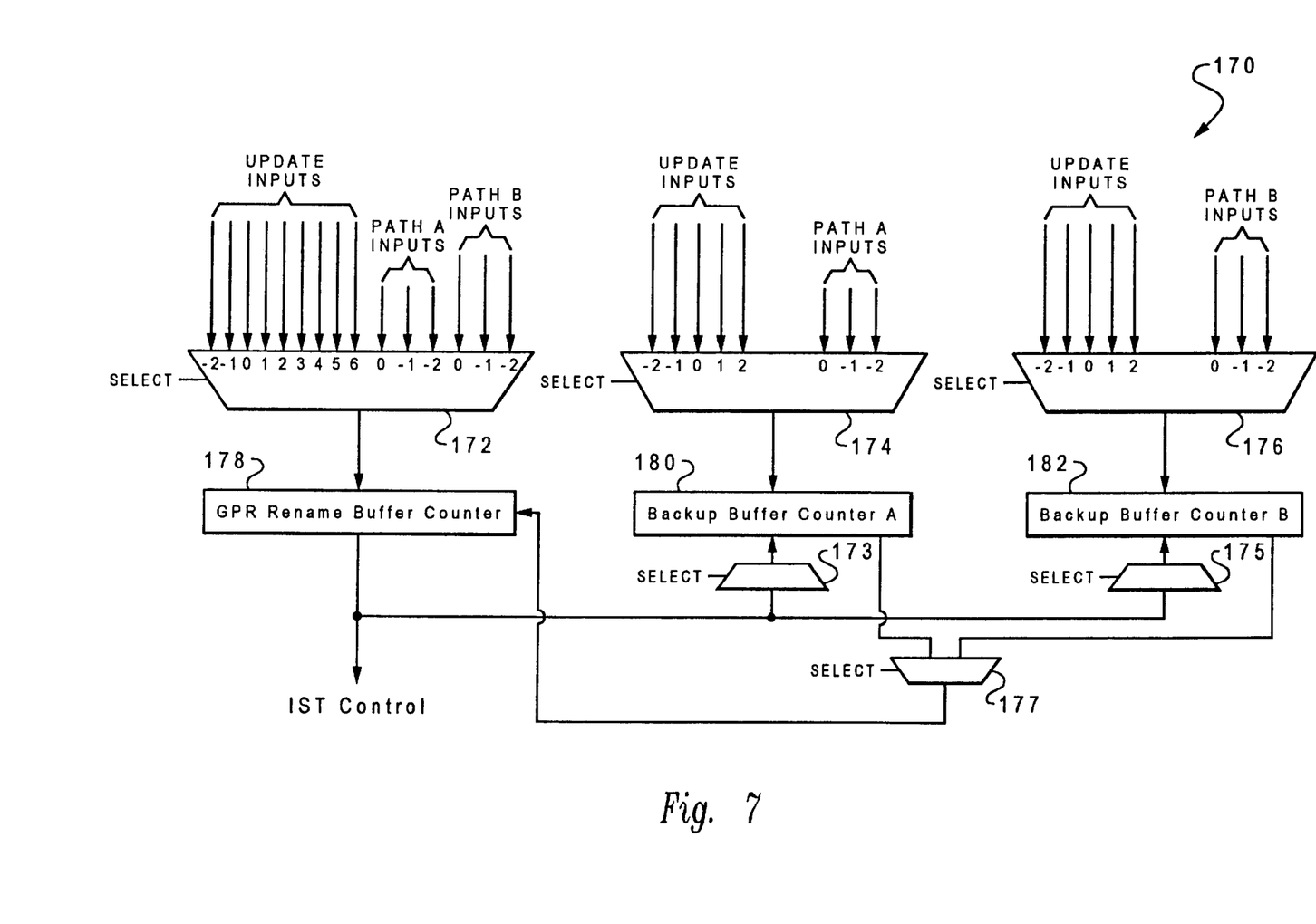
FIG. 7 illustrates a preferred embodiment of a counter which indicates a number of allocated general purpose rename buffers.

Referring now to FIGS. 5–7, there are illustrated block diagrams of IST entry counter 130, FPR rename buffer counter 150, and GPR rename buffer counter 170, which together comprise resource counters 98. With reference first to FIG. 5, IST entry counter 130 includes multiplexers 132–137 and counters 138–142. According to a preferred embodiment of the present invention, counter 138 comprises a 17-bit shift counter which indicates in decoded format how many of the 16 IST entries 110 are currently allocated to outstanding instructions. Counter 138 is said to be in decoded format since the position of a set bit (a binary "1") within the counter indicates the number of allocated entries 110. For example, when IST 80 is empty, only the least significant (left most) bit is set, indicating that 0 entries 110 are allocated; if IST 80 is full, only the most significant bit is set. By storing the counters in decoded format rather than utilizing a register which is incremented and decremented by adders, the present invention not only minimizes the cycle time utilized to update counter 138, but also minimizes the complexity of CPU 30 and the chip substrate area consumed.

During each cycle IST control 100 computes the net change in the number of allocated entries 110 from the number of instructions dispatched and completed during that cycle. In a preferred embodiment of the present invention, the net change in the number of allocated entries 100 varies between +3 during cycles in which 3 instructions are dispatched and 0 instructions are completed to –3 during cycles in which 3 instructions are completed and 0 instructions are dispatched. IST control 100 updates counter 138 to reflect the current number of allocated entries 110 by selecting the appropriate update input to multiplexer 132, which in turn shifts the set bit within counter 138 a corresponding number of bit positions. Because an entry 110 is required for each instruction dispatched, counter 138 provides an interlock that prevents dispatch unit 58 from dispatching more instructions than can be accommodated within entries 110 in IST 80.

IST entry counter 130 also includes backup buffer counter A 140 and backup buffer counter B 142, which comprise shift counters like counter 138. Backup buffer counter A 140 indicates a number of allocated IST entries 110 excluding instructions within a first speculative execution path. Similarly, backup buffer counter B 142 indicates the number of allocated IST entries 110 excluding instructions within a second speculative execution path. As will be appreciated by those skilled in the art, embodiments of the present invention which support more than two speculative execution paths include one additional backup buffer counter for each additional speculative execution path permitted.

When the first instruction within a speculative execution path is dispatched, IST control 100 enables the select input to mux 133 to load the value of counter 138, which indicates the number of IST entries 110 allocated prior to dispatching instructions during the current cycle, into backup buffer counter A 140. In addition IST control 100 selects the appropriate update input to mux 134 to update backup buffer counter A 140. For example, if the second and third instructions dispatched are speculative and 3 outstanding instructions are completed during the current cycle, IST control 100 selects the –2 update input. As illustrated, counter 140 can be incremented by a maximum of two entries since speculative instructions account for at least one of the three instructions which can be dispatched during the current cycle. During cycles while speculative execution path A remains unresolved, IST control logic 100 selects the appropriate path A input of mux 134 to update backup buffer counter A 140 to reflect the reduction in allocated entries 110 due to completion of outstanding nonspeculative instructions. If speculative execution path A is resolved as guessed correctly, the contents of backup buffer counter A 140 are simply ignored. If, however, speculative execution path A is resolved as guessed wrong, IST control 100 enables the select input to mux 137 to load the value of backup buffer counter A 140 into counter 138. In addition, IST control 100 selects the appropriate path A input to mux 132 to account for instructions completed during the current cycle. Thus, IST entry counter 138 maintains a correct count of allocated entries 110 even in cases where branches are misguessed.

As will be appreciated by those skilled in the art, mux 136 and backup buffer counter B 142 operate similarly to mux 134 and backup buffer counter A 140 to allow recovery from a second speculative execution path taken prior to the resolution of speculative path A. If speculative path A is resolved as correctly predicted and speculative path B (the second speculative execution path) is resolved as mispredicted, IST control 100 selects the appropriate input to mux 137 to load the value of backup buffer counter B 142 into counter 138. In addition, IST control 100 updates counter 138 by selecting the appropriate path B input to mux 132 to account for instructions completed during the current cycle.

Referring now to FIG. 6, there is depicted a block diagram of FPR rename buffer counter 150, which indicates the number of allocated FPR rename buffers 92. As is evident by inspection of FIG. 6, FPR rename buffer counter 150 functions much like IST entry counter 130. Backup buffer counter A 160 and backup buffer counter B 162 maintain a correct count of the number of allocated FPR rename buffers 92 in cases where either of two branch instructions are mispredicted, thereby enabling FPR rename buffer counter 150 to restore the correct FPR buffer count to counter 158 in a single cycle. In the illustrated embodiment, up to 3 of FPR rename buffers 92 can be assigned to instructions and up to 3 of FPR rename buffers 92 can be written to FPR file 96 during each cycle.

With reference now to FIG. 7, there is illustrated a preferred embodiment of GPR rename buffer counter 170, which counts the number of GPR rename buffers 90 assigned to outstanding instructions. As will be appreciated by those skilled in the art, GPR rename buffer counter 170 operates similarly to FPR rename buffer counter 150, except for a difference in the number of GPR rename buffers 90 which can be allocated and retired within a cycle. In the depicted embodiment, up to two of GPR rename buffers 90 can be assigned to each instruction upon dispatch since two GPR rename buffers 90 are required to execute a "load and update" instruction. However, only two of GPR rename buffers 90 can be written to GPR file 94 during a given completion cycle.

The design of FPR and GPR rename buffer counters 150 and 170 enhances the performance of the present invention as compared to prior art systems since resources allocated to mispredicted branches can be more quickly reallocated. Prior art processors which support speculative execution of instructions typically do not include facilities such as backup buffer counters A and B to enable the processors to recover the correct state of processor resources following a misguessed branch. In conventional processors which support speculative execution, once a branch is determined to be guessed wrong, the processor stalls the execution pipeline until all sequential instructions preceding the misguessed branch are completed. Once all valid data is committed from the rename buffers to architected registers, all of the rename buffers are flushed and reset. Thereafter, the processor continues execution and allocation of the rename buffers beginning with the sequential instruction following the alternative execution path. Although this mechanism is relatively efficient in terms of the circuitry required to recover from a misguessed branch, the recovery mechanism degrades processor performance since the processor must delay dispatching additional instructions and allocating rename buffer resources until all instructions preceding the misguessed branch are completed.

As has been described, the present invention provides an improved method and system for managing the flow of instructions through a superscaler processor which supports out-of-order execution. By maintaining an entry corresponding to each outstanding instruction within an instruction sequencing table, the present invention enables instructions executed out-of-program order by multiple execution units to be completed in order, thereby supporting precise interrupts. Furthermore, the present invention provides an efficient mechanism for recovering from misguessed branches which enables the recovery of both the program state and the resource state of the processor prior to the misguessed branch. Although a processor which employs the present invention has been described with reference to various limitations with respect to a number of instructions which can be dispatched, finished, and completed during a given processor cycle, those skilled in the art will appreciate that these limitations are merely design choices and do not serve limitations on the present invention.

While the invention has been particularly shown and described with reference to a preferred embodiment, it will be understood by those skilled in the art that various changes in form and detail may be made therein without departing from the spirit and scope of the invention.

What is claimed is:

1. A method for tracking the allocation of resources within a processor that supports speculative execution of instructions, said processor having at least one execution unit, a resource counter including a first counter and a second counter, and a plurality of resources, wherein one or more of said plurality of resources are allocated to each of a plurality of instructions dispatched for execution to said at least one execution unit, said method comprising;

in response to dispatching an instruction among said plurality of instructions to said at least one execution unit for execution:

incrementing said first counter once for each of said plurality of resources allocated to said dispatched instruction;

if said dispatched instruction is a first instruction within a speculative execution path, loading said second counter with a value of said first counter prior to incrementing said first counter;

in response to completion of in instruction among said plurality of instructions, decrementing said first and said second counters once for each resource allocated to said completed instruction; and in response to resolution of said speculative execution path as mispredicted, transferring a value of said second counter to said first counter, wherein said resource counter tracks a number of said plurality of resources allocated to said plurality of instructions.

2. The method for tracking the allocation of resources within a processor of claim 1, wherein said processor comprises a superscalar processor capable of dispatching and completing multiple instructions during each cycle, wherein said step of loading said second counter with a value of said first counter further comprises:

incrementing said second counter once for each of said plurality of resources allocated to nonspeculative instructions among said plurality of instructions that are dispatched concurrently with said first instruction within said speculative execution path.

3. The method for tracking the allocation of resources within a processor of claim 1, said speculative execution path comprising a first speculative execution path, wherein said processor concurrently supports a second speculative execution path and said resource counter further includes a third counter, said method further comprising:

in response to dispatching a selected instruction among said plurality of instructions to said at least one execution unit for execution, said selected instruction being a first instruction within a second speculative execution path, loading said third counter with a value of said first counter prior to incrementing said first counter;

in response to completion of a particular instruction among said plurality of dispatched instructions, decrementing said third counter once for each resource allocated to said particular instruction; and in response to resolution of said first speculative execution path as correctly predicted and resolution of said second speculative execution path as mispredicted, transferring a value of said third counter to said first counter, wherein said resource counter tracks a number of said plurality of resources allocated to said plurality of instructions.

4. The method for tracking the allocation of resources within a processor of claim 1, said first and said second counters comprising first and second shift registers, respectively, wherein each of said first and said second shift registers indicates a number of allocated resources among said plurality of resources by a bit position of a set bit, wherein said step of incrementing said first counter comprises shifting said set bit in a first direction within said first shift register one bit position for each of said plurality of resources allocated to said instruction, and wherein said step of decrementing said first and said second counters comprises shifting said set bits within said first and said second shift registers in a second direction one bit position for each resource allocated to said particular instruction.

5. An apparatus for tracking the allocation of resources within a processor that supports speculative execution of instructions, said processor having at least one execution unit and a plurality of resources, wherein one or more of said plurality of resources are allocated to each of a plurality of instructions dispatched for execution to said at least one execution unit, said apparatus comprising:

a resource counter having a first counter and a second counter;

means, responsive to dispatching an instruction among said plurality of instructions to said at least one execution unit, for incrementing said first counter once for each of said plurality of resources allocated to said dispatched instruction;

means for loading said second counter with a value of said first counter prior to incrementing said first counter in response to dispatching an instruction among said plurality of instructions that is a first instruction within a speculative execution path;

means, responsive to completion of an instruction among said plurality of dispatched instructions, for decrementing said first and said second counters once for each resource allocated to said completed instruction; and means for transferring a value of said second counter to said first counter in response to resolution of said speculative execution path as mispredicted, wherein said resource counter tracks a number of said plurality of resources allocated to said plurality of instructions.

6. The apparatus for tracking the allocation of resources within a processor of claim 5, wherein said processor comprises a superscalar processor capable of dispatching and completing multiple instructions during each cycle, wherein said means for loading said second counter with a value of said first counter further comprises:

means for incrementing said second counter once for each of said plurality of resources allocated to nonspeculative instructions among said plurality of instructions that are dispatched concurrently with said first instruction within said speculative execution path.

7. The apparatus for tracking the allocation of resources within a processor of claim 5, said speculative execution path comprising a first speculative execution path, wherein said processor concurrently supports a second speculative execution path and said resource counter further includes a third counter, said apparatus further comprising:

means for loading said third counter with a value of said first counter prior to incrementing said first counter in response to dispatching a selected instruction among said plurality of instructions, wherein said selected instruction is a first instruction within a second speculative execution path;

means, responsive to completion of a particular instruction among said plurality of dispatched instructions, for decrementing said third counter once for each resource allocated to said particular instruction; and means for transferring a value of said third counter to said first counter in response to resolution of said first speculative execution path as correctly predicted and resolution of said second speculative execution path as mispredicted, wherein said resource counter tracks a number of said plurality of resources allocated to said plurality of instructions.

8. The apparatus for tracking the allocation of resources within a processor of claim 5, said first and said second counters comprising first and second shift registers, respectively, wherein each of said first and said second shift registers indicates a number of allocated resources among said plurality of resources by a bit position of a set bit, wherein said means for incrementing said first counter comprises means for shifting said set bit in a first direction within said first shift register one bit position for each of said plurality of resources allocated to said instruction, and wherein said means for decrementing said first and said second counters comprises means for shifting said set bits within said first and said second shift registers in a second direction one bit position for each resource allocated to said particular instruction.

9. The apparatus for tracking the allocation of resources within a processor of claim 5, wherein said plurality of resources comprise a plurality of rename data buffers utilized to store data associated with said plurality of instructions prior to completion.

10. The apparatus for tracking the allocation of resources within a processor of claim 5, wherein said processor supports out-of-order execution of said plurality of instructions and includes an instruction sequencing table having a plurality of entries, wherein each of said plurality of instructions is assigned one of said plurality of entries sequentially according to a program order of said plurality of instructions, such that said plurality of instructions can be completed according to said program order, wherein said plurality of resources comprise said plurality of entries within said instruction sequencing table.

11. A processor, comprising:

at least one execution unit, wherein instructions dispatched to said at least one execution unit can be executed out of program order;

means for dispatching instructions to said plurality of execution units;

means for assigning an instruction identifier to each of a plurality of instructions dispatched to said plurality of execution units for execution, wherein an instruction identifier is assigned to each of said plurality of instructions sequentially according to a program order of said plurality of instructions;

a table having a plurality of entries, wherein each entry among said plurality of entries is associated with an instruction identifier and contains a finish indicator that indicates whether execution of an instruction assigned an instruction identifier associated with said each entry has finished;

means for setting a finish indicator within a particular entry among said plurality of entries within said table in response to termination of execution of an instruction assigned to an instruction identifier associated with said particular entry;

one or more pointers which point to entries within said table associated with instruction identifiers assigned to a subset of said plurality of instructions that can possibly be completed during a particular processor cycle, wherein a selected instruction among said subset is completed by transferring data associated with said selected instruction from associated ones of said plurality of rename buffers to selected ones of said plurality of data registers; and means for completing selected instructions within said subset of said plurality of instructions, wherein exceptions generated by said selected instructions have been handled, wherein instructions among said plurality of instructions which are assigned instruction identifiers preceding said selected instructions have been completed during a previous processor cycle or will be completed during the same processor cycle, and wherein instruction identifiers assigned to said selected instructions are associated with entries having set finish indicators, such that said plurality of instructions are completed according to said program order.

12. The processor of claim 11, wherein:

said processor further comprises a plurality of user-accessible data registers; and each entry within said table further comprises:

a field specifying a number of said plurality of data registers required to complete an instruction to which an instruction identifier associated with said each entry is assigned; and a field indicating exception conditions which occurred during execution of an instruction to which an instruction identifier associated with said each entry is assigned.

13. The processor of claim 11, said table having M entries, said processor further comprising:

an entry counter, including:

a primary shift register having M+1 bits, wherein said primary shift register indicates a first number of allocated entries among said plurality of entries within said table by a position of a set bit within said primary shift register;

a backup shift register having M+1 bits, said backup shift register being associated with a speculative execution path, wherein said backup shift register indicates a second number of entries among said plurality of entries which are allocated to instructions that are not within said speculative execution path; and means for transferring said second number from said backup shift register to said primary shift register in response to a determination that said speculative execution path was mispredicted.

14. The processor of claim 13, wherein said processor supports N concurrent speculative execution paths, said entry counter further comprising N backup shift registers.

15. The processor of claim 11, and further comprising:

M rename buffers;

a rename buffer counter, including, a primary shift register having M+1 bits, wherein said primary shift register indicates a first number of said plurality of rename buffers allocated to instructions which are dispatched and uncompleted by a position of a set bit within said primary shift register;

a backup shift register having M+1 bits, said backup shift register being associated with a speculative execution path, wherein said backup shift register indicates a second number of said plurality of rename buffers allocated to instructions which are dispatched and uncompleted and are not within said speculative execution path, said second number being indicated by a position of a set bit within said backup shift register; and means for transferring said second number from said backup shift register to said primary shift register in response to a determination that said speculative execution path was mispredicted.

16. The processor of claim 15, wherein said processor supports N concurrent speculative execution paths, said rename buffer counter further comprising N backup shift registers.

17. A data processing system that supports out-of-order execution of instructions, said data processing system comprising:

a memory that stores a plurality of instructions;

at least one execution unit, wherein a plurality of instructions dispatched to said at least one execution unit can be executed out of program order;

means for dispatching said plurality of instructions from said memory to said at least one execution unit;

means for assigning an instruction identifier to each of a plurality of instructions dispatched to said at least one execution unit for execution, wherein an instruction identifier is assigned to each of said plurality of instructions sequentially according to a program order of said plurality of instructions;

a table having a plurality of entries, wherein each entry among said plurality of entries is associated with an instruction identifier and contains a finish indicator that indicates whether execution of an instruction assigned an instruction identifier associated with said each entry has finished;

means for setting a finish indicator within a particular entry among said plurality of entries within said table in response to termination of execution of an instruction assigned to an instruction identifier associated with said particular entry;

one or more completion pointers which point to entries within said table associated with instruction identifiers assigned to a subset of said plurality of instructions that can possibly be completed during a particular cycle, wherein a selected instruction among said subset is completed by transferring data associated with said selected instruction from associated ones of said plurality of rename buffers to selected ones of said plurality of data registers; and means for completing selected instructions within said subset of said plurality of instructions, wherein exceptions generated by said selected instructions have been handled, wherein instructions among said plurality of instructions which are assigned instruction identifiers preceding said selected instructions have been completed during a previous cycle or will be completed during the same cycle, and wherein instruction identifiers assigned to said selected instructions are associated with entries having set finish indicators, such that said plurality of instructions are completed according to said program order.

18. The data processing system of claim 17, wherein:

said data processing system further includes a plurality of data registers; and each entry within said table further comprises:

a field specifying a number of said plurality of data registers required to complete an instruction to which an instruction identifier associated with said each entry is assigned; and a field indicating exception conditions which occurred during execution of an instruction to which an instruction identifier associated with said each entry is assigned.

19. The data processing system of claim 17, said table having M entries, said data processing system further comprising:

an entry counter, including:

a primary shift register having M+1 bits, wherein said primary shift register indicates a first number of allocated entries among said plurality of entries within said table by a position of a set bit within said primary shift register;

a backup shift register having M+1 bits, said backup shift register being associated with a speculative execution path, wherein said backup shift register indicates a second number of entries among said plurality of entries which are allocated to instructions that are not within said speculative execution path; and means for transferring said second number from said backup shift register to said primary shift register in response to a determination that said speculative execution path was mispredicted.

20. The data processing system of claim 19, wherein said data processing system supports N concurrent speculative execution paths, said entry counter further comprising N backup shift registers.

21. The data processing system of claim 17, and further comprising:

M rename buffers;

a rename buffer counter, including:

a primary shift register having M+1 bits, wherein said primary shift register indicates a first number of said plurality of rename buffers allocated to instructions which are dispatched and uncompleted by a position of a set bit within said primary shift register;

a backup shift register having M+1 bits, said backup shift register being associated with a speculative execution path, wherein said backup shift register indicates a second number of said plurality of rename buffers allocated to instructions which are dispatched and uncompleted and are not within said speculative execution path, said second number being indicated by a position of a set bit within said backup shift register; and means for transferring said second number from said backup shift register to said primary shift register in response to a determination that said speculative execution path was mispredicted.

22. The data processing system of claim 21, wherein said data processing system supports N concurrent speculative execution paths, said rename buffer counter further comprising N backup shift registers.

* * * * *

UNITED STATES PATENT AND TRADEMARK OFFICE
CERTIFICATE OF CORRECTION

PATENT NO. : 5,809,268
DATED : September 15, 1998
INVENTOR(S) : *Chan*

It is certified that error appears in the above-identified patent and that said Letters Patent is hereby corrected as shown below:

In col. 10, line 8, please delete "in" and insert --an-- before "instruction".

Signed and Sealed this

Eighteenth Day of May, 1999

*Attest:*

Q. TODD DICKINSON

*Attesting Officer*     *Acting Commissioner of Patents and Trademarks*